(No Model.) 2 Sheets—Sheet 1.

G. H. GARDNER.
PRIMARY BATTERY.

No. 530,764. Patented Dec. 11, 1894.

WITNESSES
Frank G. Parker.
Frank G. Hatter.

INVENTOR
George H. Gardner (No Model.)  2 Sheets—Sheet 2.

G. H. GARDNER.
PRIMARY BATTERY.

No. 530,764. Patented Dec. 11, 1894.

WITNESSES
Frank G. Parker.
Frank G. Hatter.

INVENTOR
George H Gardner

UNITED STATES PATENT OFFICE.

GEORGE H. GARDNER, OF BOSTON, MASSACHUSETTS.

PRIMARY BATTERY.

SPECIFICATION forming part of Letters Patent No. 530,764, dated December 11, 1894.

Application filed March 12, 1894. Serial No. 503,331. (No model.)

*To all whom it may concern:*

Be it known that I, GEORGE H. GARDNER, of Boston, in the county of Suffolk and State of Massachusetts, have invented a new and useful Improvement in Primary Batteries, of which the following, taken in connection with the accompanying drawings, is a specification.

My invention relates to the construction and arrangement of the parts of a primary battery, the object being to so construct the battery that it will be easily charged and cleansed and that the negative and positive elements may be replaced or removed and that good electrical contacts are always insured. This object I attain by the mechanism shown in the accompanying drawings, in which—

Figure 1:
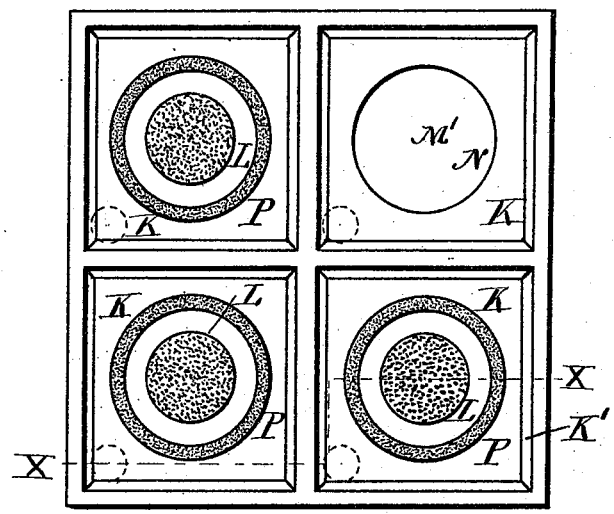
Figure 2:
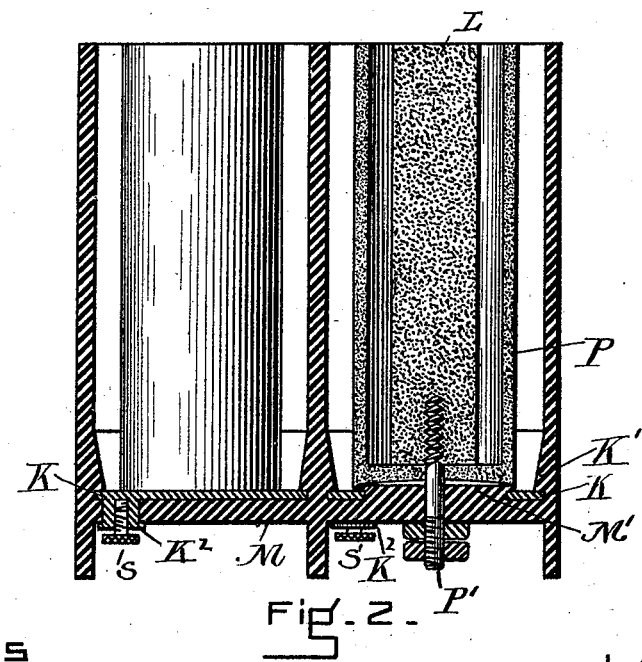
Figure 3:
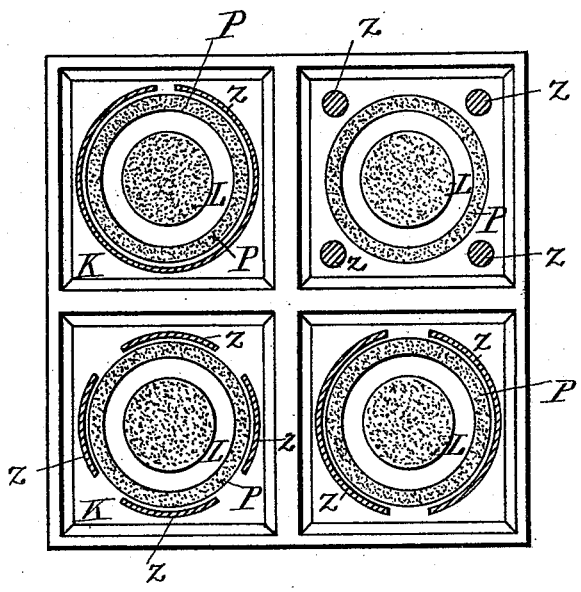

Figure 1 is a plan of my battery showing a box divided so as to form four cells, each adapted to receive a set of elements and their connections. Fig. 2 is a vertical section of the battery taken on line X—X of Fig. 1. In the drawings the zinc elements are not shown as they may be made of any desired shape and several different pieces of zinc may be used in the same cell if more convenient than to have a single piece. Fig. 3 is a plan showing four cells with different arrangements of zinc electrodes.

The box may have any number of cells and may be made of any suitable substance or substances.

In the drawings Fig. 1 shows in plan a box of four cells, three of the cells having porous cups P and carbons L. In the fourth one the cup and carbon are not represented. At the bottom of each cell is a copper plate K. This plate is formed approximately in the shape of the cell and is molded into it so that when the box comes from the mold the plates K form an integral part of it. Each of the plates K has centrally located in it a large round hole see N Fig. 1, and through this hole the substance of which the box is made protrudes as indicated at M' Fig. 2, the part M' forming a part of the bottom M of the box. The mold in which the box is formed is so constructed that the material of which the box is made extends over the inner edge of the hole N of the plate K and holds it firmly in place. The outer edges of the plates K are also covered by parts K' of the molded box so that the plates are firmly embedded in the substance of which the box is made. Each of the plates K is provided with a metallic boss $K^2$ which extends through the bottom M of the box, see Fig. 2 and is provided with a binding screw S, and thus forms the terminal of one of the elements of the cell. The copper plate K covers all of that part of the bottom of the cell that is not covered by the porous cup P, so that if a piece of zinc is simply dropped into the cell it will form an electrical contact with the plate K and through it with the terminal $K^2$ S'. It is desirable to amalgamate the copper plate K.

The zinc electrodes Z—Z Fig. 3, may be arranged as shown in the different cells, but as I do not claim any particular shape or arrangement, it is not necessary to describe them.

The box or casing may be made of hard rubber or its compounds, or of any of the various compositions suitable for molding and vulcanizing.

The porous cup P is made as shown and has within it a carbon rod L. The carbon rod L is held in place by means of a screw P of peculiar construction—that is, its upper end is provided with a coarse sharp threaded screw which is peculiarly adapted to hold firmly in carbon, while its lower end is provided with an ordinary threaded screw and binding nuts. This forms a terminal for the carbon element of the battery.

From the above description, it may be seen that this form of battery and cell admits of extreme cheapness and ease of management, characteristics which give value to primary batteries.

I claim—

1. In a primary battery, an annular metallic contact plate K molded into the material of which the cell is composed and having its edges overlaid by the said cell material and adapted to form a metallic lining for that part of the bottom of the cell that lies between the porous cup and the walls, substantially as and for the purpose set forth.

2. In a primary battery, the combination of the carbon element and porous cup; with a metallic terminal piece P' having at its upper end a coarse sharp threaded screw adapted to work its own screw in connection with the lower end of the carbon element, and by aid of screw nuts at its lower end, to clamp the said carbon element and the porous cup to the bottom of the cell of the battery, the lower end of said metallic terminal piece passing through the bottom of the cell and being provided with a screw and screw nuts outside of said bottom, substantially as and for the purpose set forth.

In testimony whereof I have signed my name to this specification, in the presence of two subscribing witnesses, on this 27th day of February, A. D. 1894.

GEORGE H. GARDNER.

Witnesses:
    FRANK G. PARKER,
    FRANK G. HATTIE.